Figure 1:
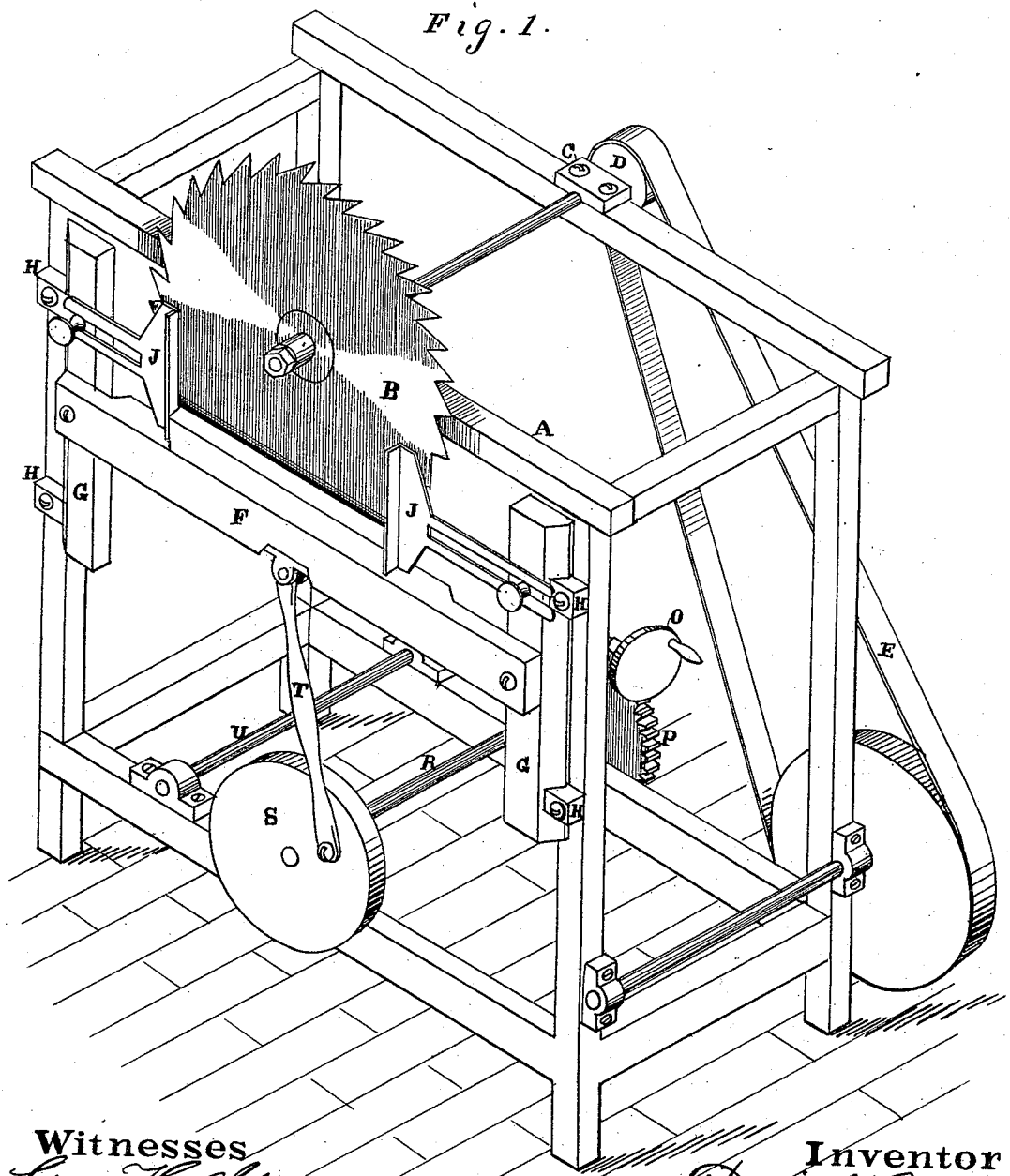

2 Sheets—Sheet 2.
D. POMEROY.
Machines for Making Barrel-Heads.
No. 196,383. Patented Oct. 23, 1877.
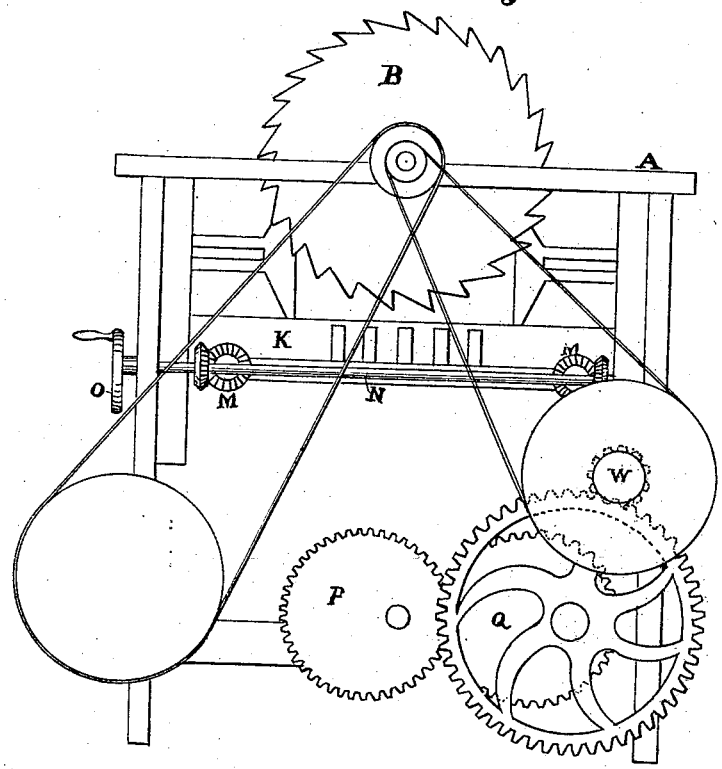
Fig. 2.
Fig. 3.
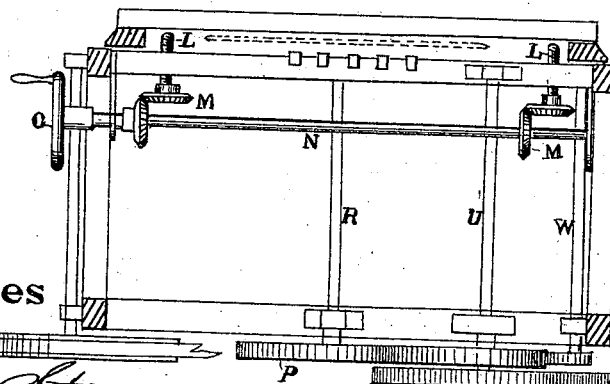
Witnesses
Geo. H. Strong
Frank P. Brooks
Inventor
David Pomeroy
By his Atty's
Dewey & Co.

UNITED STATES PATENT OFFICE.

DAVID POMEROY, OF SAN FRANCISCO, CALIFORNIA.

IMPROVEMENT IN MACHINES FOR MAKING BARREL-HEADS.

Specification forming part of Letters Patent No. 196,383, dated October 23, 1877; application filed August 30, 1877.

*To all whom it may concern:*

Be it known that I, DAVID POMEROY, of the city and county of San Francisco, and State of California, have invented an Improved Heading-Mill; and I do hereby declare the following to be a full, clear, and exact description, reference being had to the accompanying drawings.

My invention relates to improvements in heading-mills; and consists in a novel arrangement for feeding the saw-table, in such a manner that the approach to the saw is slow to allow the cutting of the timber, while the downward or withdrawing movement is made rapidly, thus increasing the capacity of the mill, and causing a saving of the labor employed.

It also consists in the use of adjustable jaws attached to the saw-table for holding the stick or timber to be sawed, which do away with the necessity of using dogs to hold the bolt, and allow a rapid feed with but little labor.

My invention will be more fully understood by referring to the accompanying drawings, in which Figure 1 is a perspective view; Fig. 2, a front elevation; Fig. 3, a plan.

A is the frame of the machine, carrying the saw B, which runs in a vertical plane, its arbor running in the boxes C C upon the top of the frame A, and being driven by a pulley, D, and belt E. The sawing-table F moves vertically upon the front of the frame A and beneath the saw, and has slides G, which move in the guides H H, as shown.

In order to hold the material to be sawed, and allow it to be fed forward at each movement of the table without the use of dogs or mechanical feeding devices, I employ two jaws, J, which are secured to the slides G by set-screws, so as to be readily adjusted to any size of material which it may be desirable to cut. These jaws prevent any motion of the block as it stands upon the table while the saw is passing through it, and after the table is withdrawn from the saw the bolt may be easily pushed forward against the gage K, ready for a new cut, as the jaws do not press against the block, and the table, jaws, and saw hold it steadily while the cut is being made.

The gage is adjusted by means of screws L at each end, and these screws are turned by the miter-gears M, operated by the main shaft N and hand-wheel O from one side.

In order to feed the material to the saw at the proper rate of speed, and to return the table rapidly after the cut has been made, it is necessary to construct a variable feed; and this I have effected in the present case by the use of eccentric-gears P Q, one being mounted upon the shaft R, which carries the crank-wheel S. This crank-wheel operates the table, moving it up and down by means of the pitman T. The other eccentric-gear, Q, is secured to the shaft U, and this shaft carries a gear-wheel, V, which is driven by a pinion upon the shaft W, and by means of pulleys and belt from the driving-shaft this feeding mechanism is operated at the proper rate of speed.

This combination of mechanisms gives me many advantages over horizontal heading-mills. The block being fed up vertically from below, the product drops out of the way as soon as it is cut off. I am also enabled to employ my guiding and holding jaws, which retain the block in place, but do not hold it rigidly, so that it may be fed forward to the gage after each cut by simple pressure of the hand.

With this mill I am enabled to resaw one-inch boards, as no dogs are required to hold the board.

Having thus described my invention, what I claim, and desire to secure by Letters Patent, is—

1. The vertically-moving table F, with its adjustable jaws J, in combination with the gage K, adjusting-screws L, gears M, and shaft N, substantially as and for the purpose herein described.

2. The vertically-moving table of a heading-mill, in combination with the eccentric-gears P Q, crank-wheels S, and pitman T, substantially as and for the purpose herein described.

In witness whereof I have hereunto set my hand and seal.

DAVID POMEROY. [L. S.]

Witnesses:
 GEO. H. STRONG,
 FRANK A. BROOKS.